United States Patent [19]
Showalter

[11] Patent Number: 6,033,334
[45] Date of Patent: Mar. 7, 2000

[54] TRANSFER CASE HAVING SPEED PROPORTIONAL CLUTCH

[75] Inventor: Dan J. Showalter, Plymouth, Mich.

[73] Assignee: Borg-Warner Automotive, Inc., Troy, Mich.

[21] Appl. No.: 09/103,988

[22] Filed: Jun. 24, 1998

[51] Int. Cl.[7] .................................................. F16H 37/08
[52] U.S. Cl. ................................... 475/206; 192/105 BA; 180/249
[58] Field of Search ................................. 192/48.4, 48.3, 192/48.92, 105 BA; 180/248, 249, 250; 475/206

[56] References Cited

U.S. PATENT DOCUMENTS

| | | | |
|---|---|---|---|
| 1,215,513 | 2/1917 | Fichter . | |
| 1,870,494 | 8/1932 | Damrow . | |
| 2,148,243 | 2/1939 | Nahigyan et al. | 192/105 |
| 2,796,941 | 6/1957 | Hill | 180/44 |
| 2,942,711 | 6/1960 | Zindler | 192/105 BA |
| 3,132,297 | 1/1979 | Brown et al. | 192/36 |
| 3,519,314 | 7/1970 | Ballard | 303/21 |
| 3,565,224 | 2/1971 | Argereu | 192/105 |
| 3,687,254 | 8/1972 | Bystrom | 192/105 |
| 3,941,199 | 3/1976 | Williams | 180/44 |
| 4,047,601 | 9/1977 | Fogelberg et al. | 192/36 |
| 4,058,027 | 11/1977 | Webb | 74/711 |
| 4,119,168 | 10/1978 | Fogelberg | 180/49 |
| 4,124,085 | 11/1978 | Fogelberg | 180/49 |
| 4,184,575 | 1/1980 | Fogelberg | 192/36 |
| 4,332,304 | 6/1982 | Barnow | 180/233 |
| 4,440,042 | 4/1984 | Holdeman | 74/785 |
| 4,457,185 | 7/1984 | Yoshida et al. | 192/48.3 X |
| 4,674,612 | 6/1987 | Ogura | 192/48.92 |
| 4,704,920 | 11/1987 | Kurata | 180/249 X |
| 4,714,129 | 12/1987 | Mueller | 180/248 |
| 4,848,508 | 7/1989 | Smirl et al. | 180/248 |
| 4,878,566 | 11/1989 | Hamada et al. | 192/13 |
| 4,905,808 | 3/1990 | Tomita et al. | 192/85 |
| 5,195,604 | 3/1993 | Brockett et al. | 180/248 |
| 5,355,748 | 10/1994 | Ito et al. | 74/650 |
| 5,738,604 | 4/1998 | Dick | 475/206 |
| 5,782,328 | 7/1998 | Fogelberg et al. | 192/48.6 X |

*Primary Examiner*—Charles A Marmor
*Assistant Examiner*—Ha Ho
*Attorney, Agent, or Firm*—Brinks, Hofer, Gilson & Lione; Greg Dziegielewski

[57] ABSTRACT

A transfer case having a mechanically parallel overrunning clutch and centrifugal, speed proportional clutch provides improved handling characteristics especially in off-throttle driving conditions. The transfer case includes a one-way or overrunning clutch which provides drive from the rear driveline to the front driveline to rotate the front driveline and wheels at least as fast as the rear driveline and wheels. For example, the one-way clutch will be engaged when the rear drive wheels lose traction and attempt to overspeed the front drive wheels. The clutch overruns, however, if the front driveline and wheels are urged to overrun the rear driveline. The mechanically parallel speed responsive, i.e., centrifugal, clutch provides speed proportional engagement or coupling between the two drivelines and is particularly effective to reduce speed differences therebetween as its clutching and torque transfer effects are in direct proportion to the speed difference between the two drivelines. The preferred embodiment transfer case assembly is a single speed device incorporating the overrunning and centrifugal clutches. A first alternate embodiment transfer case assembly includes not only the overrunning and centrifugal clutches but also a speed reducing planetary gear assembly which provides a reduced speed drive range in addition to direct drive.

20 Claims, 4 Drawing Sheets

6,033,334

TRANSFER CASE HAVING SPEED PROPORTIONAL CLUTCH

BACKGROUND OF THE INVENTION

The invention relates generally to motor vehicle transfer cases and more specifically to a motor vehicle transfer case having a one-way or overrunning clutch and a speed proportional centrifugal clutch disposed in mechanical parallel between the primary and secondary outputs of the transfer case.

Motor vehicle four wheel drive systems have become increasingly sophisticated during the last decade. Such sophistication has been accompanied by improved understanding of vehicle dynamics and the more fundamental requirements of such systems. Better understanding of the fundamentals of vehicle dynamics has revived a focus on less sophisticated mechanical systems. For example, it was once proposed to provide four wheel drive from a primary, typically rear, driveline to a secondary or front driveline through a one-way or overrunning clutch which would engage and transfer torque from the rear driveline to the front driveline whenever the rear driveline attempted to overspeed the front driveline, typically because of a loss of traction of the rear drive wheels. However, due to the characteristics of one-way or overrunning clutches, the system was incapable of providing four wheel drive in reverse. This deficiency was problematic in that the drive system would provide only two wheel drive when, for example, attempting to back out of deep snow or mud or while in reverse when attempting to rock the vehicle.

Also, at speed, a transfer case utilizing a one-way clutch could produce vehicle instability if the foot was lifted off of the throttle and the engine compression braking, which would slow only the rear wheels, created sufficient drag to break traction on these drive wheels.

It is known that the higher the engine speed, the more compression braking the engine creates in an off throttle condition. Since vehicle speed is proportional to engine speed, engine compression braking is also proportional to vehicle speed. The need for torque delivery to the front driveline to overcome the possible instability generating effects of engine braking at the rear wheels is also directly proportional of vehicle speed. Since the speed of the drive shafts of a vehicle also obviously varies with vehicle speed, a device which achieves cross driveline torque transfer, i.e., from the front driveline to the rear driveline in proportion to speed will compensate for the effects of engine braking and improve vehicle performance and stability.

SUMMARY OF THE INVENTION

A transfer case having a mechanically parallel overrunning clutch and centrifugal, speed proportional clutch provides improved handling characteristics especially in off-throttle driving conditions. The transfer case includes a one-way or overrunning clutch which provides drive from the rear driveline to the front driveline to rotate the front driveline and wheels at least as fast as the rear driveline and wheels. For example, the one-way clutch will be engaged when the rear drive wheels lose traction and attempt to overspeed the front drive wheels. The clutch overruns, however, if the front driveline and wheels are urged to overrun the rear driveline a situation that occurs when turning a corner.

The mechanically parallel speed responsive, i.e., centrifugal, clutch provides speed proportional engagement or coupling between the two drivelines and is particularly effective to reduce speed differences therebetween as its clutching and torque transfer effects are in direct proportion to the speed difference between the two drivelines.

The preferred embodiment transfer case assembly is a single speed device incorporating the overrunning and centrifugal clutches. A first alternate embodiment transfer case assembly includes not only the overrunning and centrifugal clutches but also a speed reducing planetary gear assembly which provides a reduced speed drive range in addition to direct drive. Both embodiments provide stability enhancing torque delivery in four wheel drive vehicles with only passive mechanical transfer case components.

Thus it is an object of the present invention to provide a motor vehicle driveline component having a one-way or overrunning clutch disposed in mechanical parallel with a speed proportional, centrifugal clutch.

It is a further object of the present invention to provide a single speed motor vehicle transfer case assembly having a one-way or overrunning clutch disposed in mechanical parallel with a speed proportional clutch.

It is a further object of the present invention to provide a motor vehicle transfer case assembly having only passive, mechanical components which control and proportion torque delivery between the front and rear drivelines of a motor vehicle.

It is a still further object of the present invention to provide a motor vehicle transfer case assembly having a planetary gear speed reduction assembly and mechanically parallel overrunning and speed proportional clutches.

Further objects and advantages of the present invention will become apparent by reference to the following description of the preferred and alternate embodiments and appended drawings wherein like reference numbers refer to the same component, element or feature.

DESCRIPTION OF THE PREFERRED AND ALTERNATE EMBODIMENTS

Figure 1:
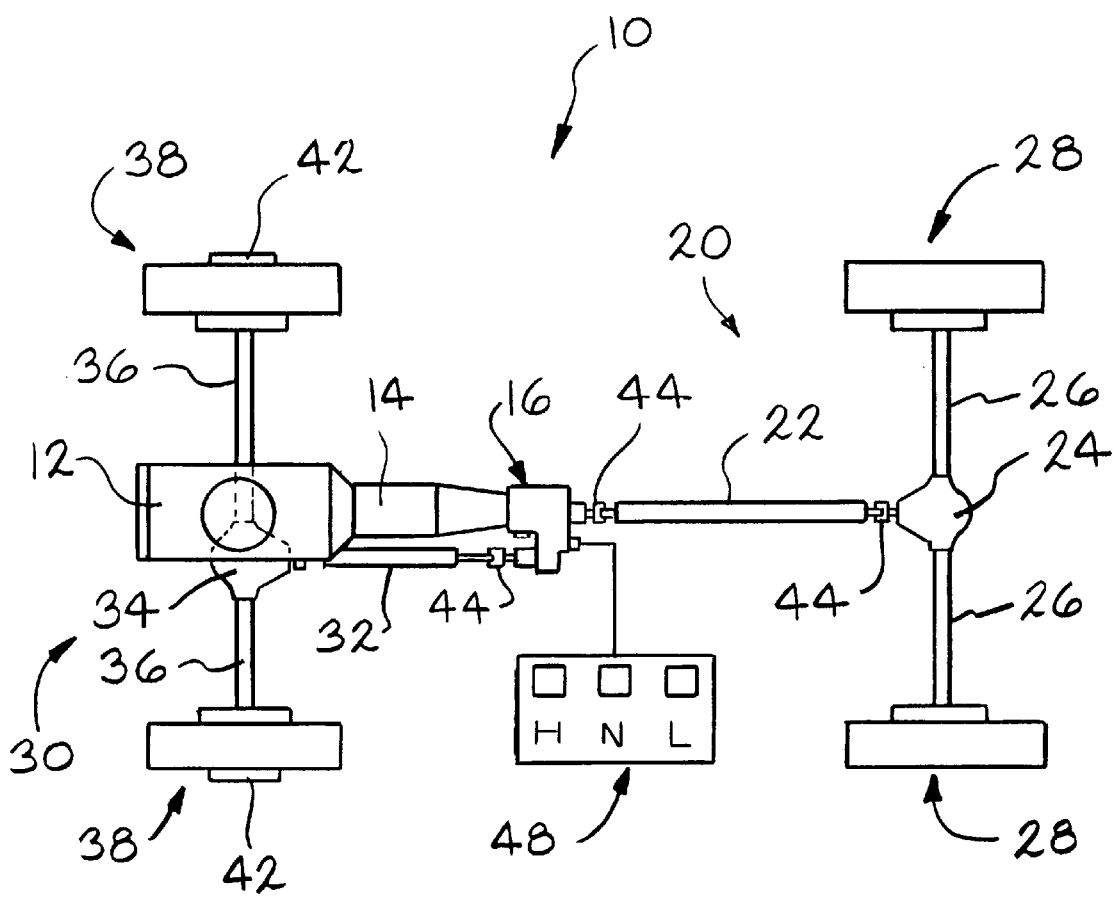
FIG. 1 is a diagrammatic, plan view of a four-wheel drive motor vehicle driveline incorporating the present invention.

Referring now to FIG. 1, a motor vehicle drive system incorporating the present invention is illustrated and generally designated by the reference number 10. The motor vehicle drive system 10 includes a prime mover, such as an internal combustion engine 12, which drives a conventional transmission 14 which may either be a manual transmission with a clutch or an automatic transmission. The output of the transmission 14 drives a transfer case assembly 16. In turn, the transfer case assembly 16 is operably coupled to and drives a rear or primary driveline 20 having a rear drive shaft 22 which is operably coupled to and drives a rear differential 24. The rear differential 24 drives a pair of aligned rear axles 26 which are coupled to a respective pair of rear tire and wheel assemblies 28.

The transfer case assembly 16 also provides torque to a front or secondary driveline 30. The front driveline 30 includes a front drive shaft 32 which in turn drives the front differential 34. The front differential 34 operates in conventional fashion and provides drive torque through a pair of aligned front axles 36. A pair of front tire and wheel assemblies 38 are disposed at the front of the vehicle. A pair of locking hubs 42 may be operably disposed between a respective one of the front pair of axles 36 and the associated front tire and wheel assembly 38. The locking hubs 42 may be either remotely operated and thus include electrical or pneumatic operators or may be manually activated. Alternatively, the front tire and wheel assemblies 38 may be connected directly to respective ones of the front axles 36 and front axle disconnects (not illustrated) may be housed within the front differential 34 and the axle disconnects may be activated or deactivated to couple or uncouple the front axles 36 from the output of the front differential 34. Finally, both the rear driveline 20 and the front driveline 30 may include suitable and appropriately disposed universal joints 44 which function in conventional fashion to allow static and dynamic offsets and misalignments between the various shafts and components.

Depending upon whether the transfer case assembly 16 is that type denominated a single speed type, i.e., having only a single output (direct drive) speed range and described herein as the preferred embodiment or a two speed type, i.e., including a speed reduction assembly providing a low speed drive range in addition to a direct or high speed range and described herein as the alternate embodiment, the assembly 10 will not or will include an operator selectable speed range control assembly 48 containing, for example, three push-button switches which facilitate manual selection of high or low gears or speed ranges and neutral.

Figure 2:
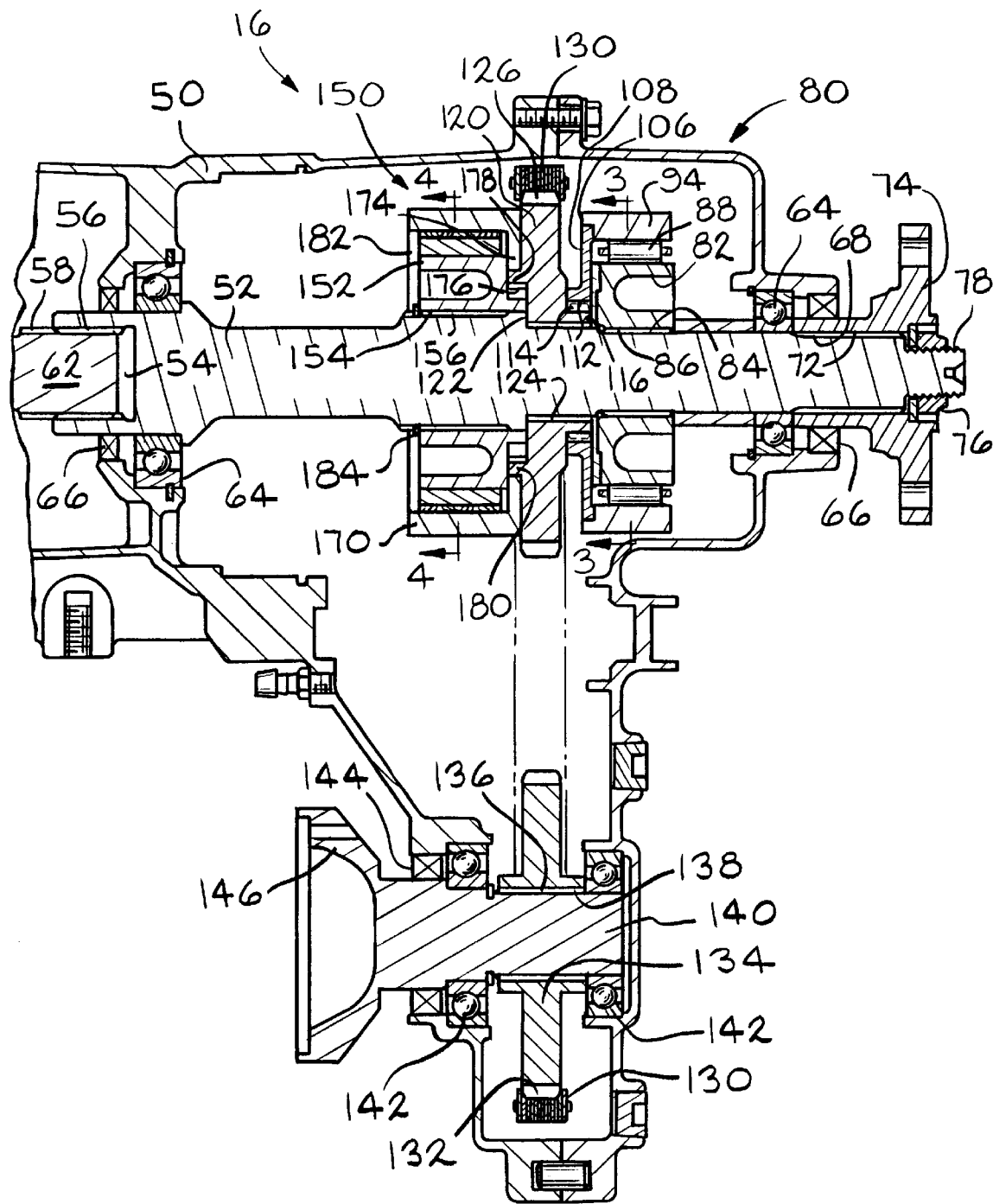
FIG. 2 is a full, sectional view of a preferred embodiment motor vehicle transfer case assembly according to the present invention.

Referring now to FIGS. 1 and 2, the transfer case assembly 16 includes a multiple part, typically cast housing 50 having various openings for shafts and fasteners, various locating grooves and mounting surfaces and other internal surfaces and features as will be readily appreciated. The transfer case assembly 16 also includes a main shaft 52 which extends from the front to the rear of the housing 50 (left to right as viewed in FIG. 2) and includes a re-entrant bore 54 adjacent the front or input end of the main shaft 52 having female splines 56 formed therein which engage complementary male splines 58 on an output shaft 62 of the vehicle transmission 14. The main shaft 52 is supported for free rotation by a pair of anti-friction assemblies such as the ball bearing assemblies 64 disposed at the front and the rear of the transfer case assembly 16. Outwardly adjacent the ball bearing assemblies 64 are a respective pair of suitable oil seals 66 which provide a fluid tight seal between the main shaft 52 and the housing 50. At the right or output end of the main shaft 52 are male splines 68 which mate with complementarily configured female splines 72 on an output flange 74. The output flange 74 is preferably secured to the main shaft 52 by a threaded fastener such as a nut 76 received upon a complementarily threaded region 78 of the main shaft 52. The output flange 74 may be a portion of a universal joint such as the universal joint 44 or may be connected to or receive other driveline and power transmitting components (not illustrated).

Figure 3:
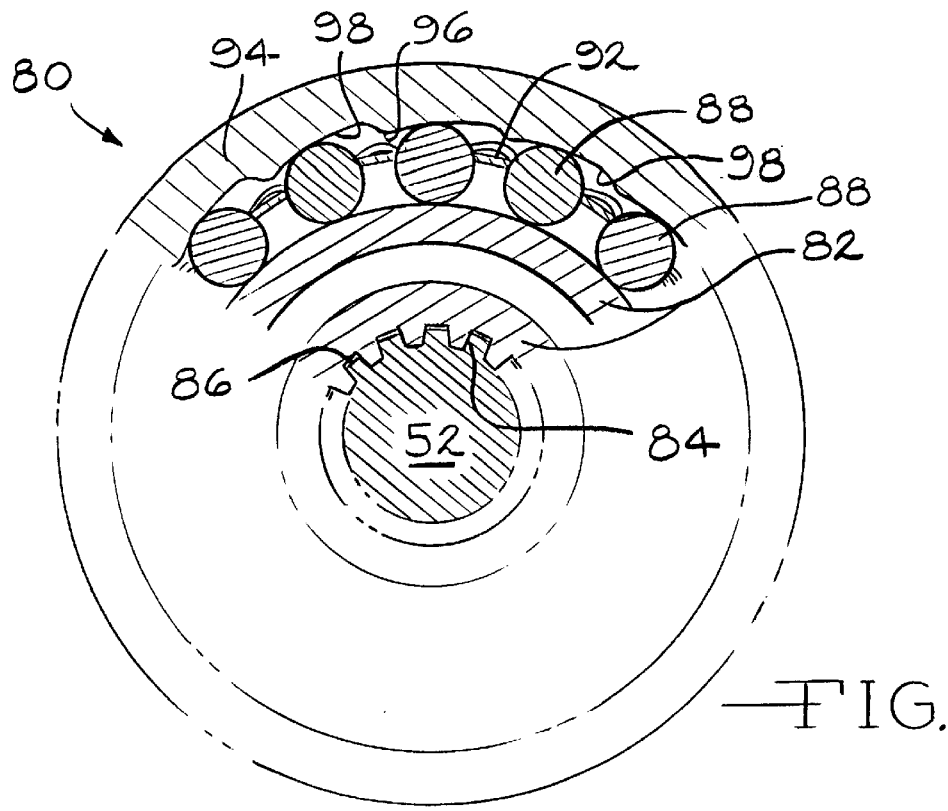
FIG. 3 is a full, sectional view of an overrunning clutch assembly of a motor vehicle transfer case assembly according to the present invention taken along line 3—3 of FIG. 2.

Referring now to FIGS. 2 and 3, the transfer case assembly 16 also includes a one-way or overrunning clutch assembly 80. The overrunning clutch assembly 80 includes a center drive member 82 having female or internal splines 84 which drivingly engage male or external splines 86 on the main shaft 52. Disposed at circumferentially spaced-apart locations about the outer surface of the center drive member 82 are a plurality of clutch rollers 88. The clutch rollers 88 are maintained in spaced relation by a cage 92 which extends circumferentially and concentrically about the center drive member 82. Radially outwardly adjacent the clutch rollers 88 is a driven annulus 94 having an inner surface 96 defining a plurality of ramps or cam surfaces 98. One of the ramps 98 is associated with each of the clutch rollers 88. The ramps or cam surfaces 98 are arranged and sized to drive the clutch rollers 88 into intimate contact with the surface of the center drive member 82 and transmit torque when the main shaft 52 is rotating counter-clockwise when viewed in FIG. 3 (from the rear of the transfer case assembly 16) to rotate the annular member 94 at least as fast as the main shaft 52. Contrariwise, the clutch rollers 88 and the cam surfaces 98 allow the annular member 94 to free wheel and rotate in the counter-clockwise direction at a speed faster than that of the center drive member 82 and the main shaft 52.

The annular driven member 94 is secured by a plurality of interengaging splines or teeth 106 and an adhesive or other positive securement means such as welding to a circular plate 108. Alternatively, the annular driven member 94 may be integrally formed with the circular plate 108 which has a plurality of internal or female splines or gear teeth 112. The female splines or gear teeth 112 are received upon a complimentarily configured set of male splines or gear teeth 114 formed on an axially extending shoulder 116 of a chain drive sprocket 120. Alternatively, interengaging lugs (not illustrated) projecting from the chain drive sprocket 120 may be received within complementarily configured apertures or slots (also not illustrated) formed in the circular plate 108. Thus, the annular driven member 94 is rotationally coupled to and rotates with the chain drive sprocket 120.

The chain drive sprocket 120 is freely rotatably mounted upon the main shaft 52 and is axially positioned by a shoulder 122 on the main shaft 52. A bushing or journal bearing collar 124 may be disposed between the chain drive sprocket 120 and the main shaft 52 to facilitate its free rotation thereabout.

The chain drive sprocket 120 includes a plurality of chain engaging teeth 126 on its periphery which drivingly engage a chain 130. The chain 130, in turn, engages a plurality of chain engaging teeth 132 disposed on a driven chain sprocket 134. The driven chain sprocket 134 defines a plurality of female or internal splines 136 which engage a complementarily configured plurality of male or external splines 138 on a secondary output shaft 140. The secondary output shaft 140 is supported for free rotation by a pair of anti-friction bearings such as ball bearing assemblies 142. A suitable oil seal 144 disposed adjacent the forward ball bearing assembly 142 provides an appropriate seal between the secondary output shaft 140 and the housing 50. The secondary output shaft 140 may preferably include a flange 146 or similar configuration which may be a portion of a universal joint 44 or other driveline connection or component.

Figure 4:
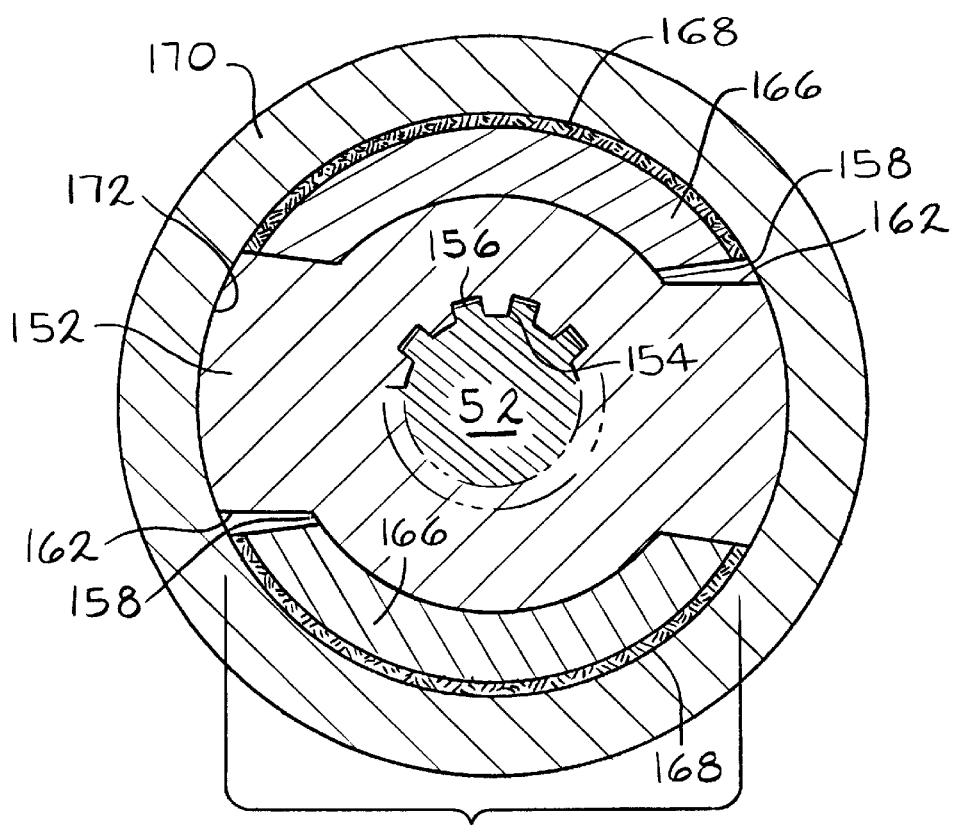
FIG. 4 is a fragmentary, sectional view of a centrifugal clutch of a motor vehicle transfer case assembly according to the present invention taken along line 4—4 of FIG. 2.

Referring now to FIGS. 2 and 4, disposed adjacent the opposite side of the chain drive sprocket 120 from the one-way clutch assembly 80 is a centrifugal clutch assembly 150. The centrifugal clutch assembly 150 includes a center clutch member 152 having internal or female splines 154 which engage complementarily configured external or male splines 156 formed in the main shaft 52. The center clutch member 152 includes opposed, reduced diameter regions 158 with oblique end surfaces 162 which define a pair of arcuate recesses 164. Received within the pair of arcuate recesses 164 are a respective pair of complementarily configured arcuate clutch shoes 166. The clutch shoes 166 include an outer surface layer of a suitable clutch friction material 168. Each of the clutch shoes 166 preferably extends over approximately 110° but may extend from approximately 90° to approximately 140°. Although two clutch shoes 166 are shown, a larger number such as three, four, five, six or more smaller clutch shoes 166 disposed in appropriately sized recesses 164 may be utilized.

Concentrically disposed about the center clutch member 152 and spaced a small distance from the outer surface of the friction material 168 when the assembly is at rest is an annular clutch member 170. The annular clutch member 170 defines an inwardly directed clutch surface 172 which is frictionally engaged by the clutch friction material 168. The annular clutch member 170 also includes a radially inwardly extending circular web or flange 174 having a plurality of internal or female splines or gear teeth 176. The female splines or gear teeth 176 are received upon a complementary plurality of male splines or gear teeth 178 formed on an axially extending shoulder 180 of the chain drive sprocket 120. Alternatively the flange 174 may include apertures (not illustrated) which receive complementarily configured projections or lugs (also not illustrated) extending from the side of the chain drive sprocket 120. Thus, the annular clutch member 170 of the centrifugal clutch assembly 150 is rotationally coupled to and rotates with the chain drive sprocket 120. Finally, the centrifugal clutch assembly 150 includes a flat circular plate 182 which axially positions the annular clutch member 170 relative to the main shaft 52. A snap ring 184 axially locates the circular plate 182 which is free to rotate relative to the main shaft 52.

The preferred embodiment transfer case assembly 16 according to the present invention which is of a type generally designated as a single speed transfer case both provides four wheel drive as needed when the rear wheels attempt to overspeed the front wheels by virtue of engagement of the one-way clutch assembly 80 and minimizes the effects of engine breaking by driving the speeds of the drive shafts to a synchronous state by virtue of the centrifugal clutch assembly 150. These two operating characteristics of the transfer case assembly 16 improve vehicle handling and stability. While the one-way clutch assembly 80 and the centrifugal clutch assembly 150 are disposed and thus operate in mechanical parallel, the operational aspects of the-one way clutch assembly 80 will be first described independent of the centrifugal clutch assembly 150. In the following discussion, it should be noted that the main shaft 52 rotates in a counter-clockwise direction when the associated vehicle moves forward in accordance with generally accepted industry convention. In a vehicle having a main drive shaft which rotates clockwise to move forward, the engage/free wheel characteristics of the one-way clutch assembly 80 must necessarily be reversed.

The one-way or overrunning clutch assembly 80 is configured to drive the front driveline 30 at a speed at least equal to the speed of the rear driveline 20 as well as allow the front driveline 30 to overspeed or overrun the rear driveline 20. This provides two basic operational benefits: the first is that if one or both of the tire and wheel assemblies 28 of the rear driveline 20 lose traction, torque is immediately provided to the front driveline 30 and the front tire and wheel assemblies 38. Second, when the vehicle is turning a corner and the front tire and wheel assemblies 38 traverse longer radii arcs than the rear tire and wheel assemblies 28, overspeed of the front driveline 30 and tire and wheel assemblies 38 will be permitted. Thus, the one-way clutch assembly 80 ensures that the front driveline 30 and the associated tire and wheel assemblies 38 will not rotate more slowly than the rear driveline 20 and the rear tire and wheel assemblies 28 but that the front driveline 30 and associated tire and wheel assemblies 38 may rotate more rapidly than the rear driveline 20 and associated tire and wheel assemblies 28.

This passive, mechanical control and torque delivery action of the one-way clutch assembly 80 is combined, i.e., is in mechanical parallel, with that of the centrifugal clutch assembly 150 which provides frictional coupling and thus torque transfer from the front driveline 30 to the rear driveline 20 in accordance with two variables: the speed of the rear driveline 20 which corresponds to the rotational speed of the clutch shoes 166 and is thus proportional to the outwardly directed frictional force applied by such clutch shoes 166 against the clutch surface 172 of the annular clutch member 170 and the speed difference between the rear driveline 20 and the front driveline 30. That is, if the speeds of the clutch shoes 166 and the annular clutch member 170 are equal, notwithstanding the fact that they may be both rotating at a relatively high speed, there will be no torque transfer between the clutch components. Similarly, if the rear driveline 20 and thus the clutch shoes 166 are not rotating, regardless of the speed of the front driveline 30 and the annular driven member 170, there will be effectively no torque transfer through the centrifugal clutch assembly 150.

When, however, the rear driveline 20 and the clutch shoes 166 are rotating, and there is a speed difference, that is, the annular clutch member 170 is rotating at a speed higher than the brake shoes 166, there will be frictional engagement between these components and, accordingly, torque transfer. Frictional coupling and torque transfer on the order of at least 40 to 60 pounds·feet of torque can readily be achieved. Coupling and torque transfer (in pounds·feet) numerically equal to the speed of the vehicle in miles per hour has been found desirable. Thus, coupling and torque transfer up to about 80 pounds·feet of torque or more, depending upon, for example, vehicle weight, may be desirable and appropriate to provide optimal vehicle handling characteristics.

Note that while such torque transfer would occur in a transfer case having only a centrifugal clutch assembly 150 regardless of whether the front driveline 30 and the annular clutch member 170 is rotating faster or slower than the rotating clutch shoes 166 and associated rear driveline 20, the latter operating condition could not occur in the transfer case assembly 16 disclosed as incorporation of the one-way clutch assembly 80 in the transfer case assembly 16 would and does preclude rotation of the front driveline 30 at a speed slower than that of the rear driveline 20, as noted above. Thus, with the transfer case configuration disclosed, the clutching and torque transfer action of the centrifugal clutch assembly 150 occurs only when the front driveline 30 overruns the rotating rear driveline 20 as the opposite condition does not and cannot occur.

This combination of operating and torque delivery characteristics provides improved vehicle control in circumstances such as off throttle operation where engine braking might cause loss of traction of the rear tire and wheel assemblies 28 which could occur with use of only the one-way clutch assembly 80. The additional centrifugal clutch assembly 150 attempts to drive the speed difference back to zero and provides torque transfer from the front driveline 30 to the rear driveline 20 in proportion to the rotational speed of the rear driveline 20 and the extent to which the front driveline 30 is rotating faster than the rear driveline 20.

Figure 5:
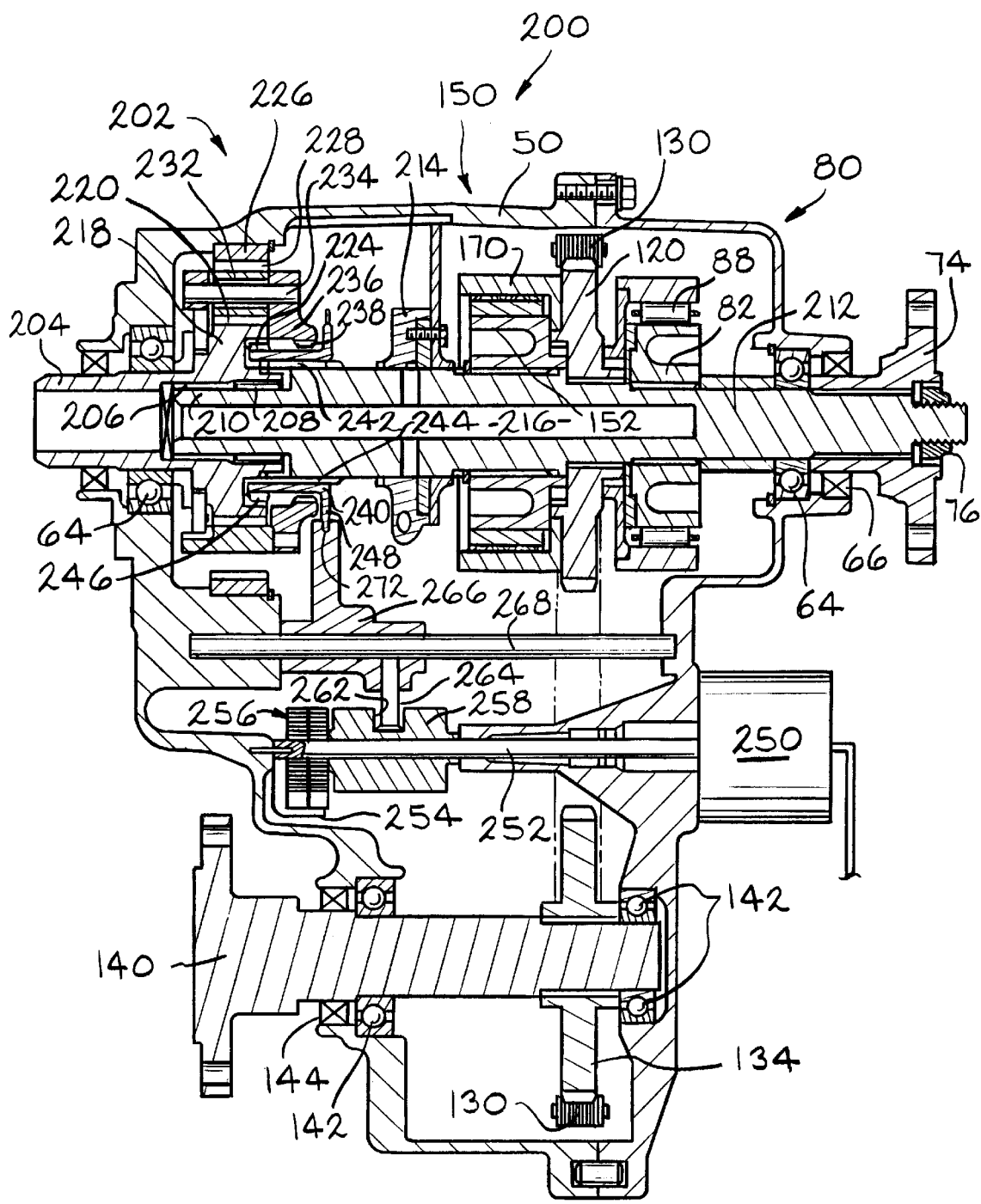
FIG. 5 is a full, sectional view of a first alternate embodiment motor vehicle transfer case assembly according to the present invention.

Referring now to FIG. 5, a first alternate embodiment transfer case assembly of a type generally referred to as a two-speed transfer case is illustrated and designated by the reference number 200. The two speed first alternate embodiment transfer case 200 includes a planetary gear assembly 202 within the housing 50 which is driven by an input shaft 204 rotatably supported within the housing 50 of the transfer case assembly 200 by one of the ball bearing assemblies 64. The input shaft 204 is coupled to and driven by the output of the transmission 14 illustrated in FIG. 1. The input shaft 204 defines a re-entrant bore 206 which receives a roller bearing assembly 208. The roller bearing assembly 208, in turn, receives and rotatably supports the forward terminus 210 of a primary output shaft 212. A gerotor pump 214 may be secured about and driven by the output shaft 212. The gerotor pump 214 provides lubricating fluid under pressure to a passageway 216 which extends axially within the output shaft 212 and distributes lubricating and cooling fluid to components of the transfer case assembly 200.

In the planetary gear assembly 202, the input shaft 204 defines an enlarged, bell-shaped region 218 having a plurality of external teeth which define a sun gear 220. On the inner surface of the bell-shaped region 218 of the input shaft 204 are a plurality of female splines or gear teeth 224. Radially aligned with the teeth of the sun gear 220 and secured to the housing 50 is a stationary ring gear 226 having a plurality of female or internal gear teeth 228. A plurality of planet or pinion gears 232, one of which is illustrated in FIG. 5, are rotatably received upon a like plurality of stub shafts 234 which are fixedly mounted within a planetary gear carrier 236. The carrier 236 includes a plurality of inwardly directed female splines or gear teeth 238 on a surface generally axially adjacent but spaced from the internal splines or gear teeth 224 defined by the input shaft 204. The planetary gear assembly 202 is more fully described in co-owned U.S. Pat. No. 4,440,042 which is herein incorporated by a reference.

An axially sliding, that is, dog type, clutch 240 is received about the output shaft 212. The dog clutch 240 defines an inwardly directed plurality of female splines or gear teeth 242 which are complementary to and mate with a like plurality of external splines or male gear teeth 244 disposed about the periphery of the output shaft 212. The dog clutch 240 thus rotates with the output shaft 212 but may slide axially therealong. The dog clutch 240 includes a region of male splines or external gear teeth 246 which are complementary to the teeth or splines 224 and 238 disposed on the input shaft 204 and the planetary gear carrier 236, respectively. The dog clutch 240 also includes a radially and circumferentially extending flange 248 on its end opposite the gear teeth 246.

The dog clutch 240 is axially translatable between a first, forward position wherein the external teeth 246 of the dog clutch 240 engage the gear teeth 224 and provide direct drive between the input shaft 204 and the output shaft 212 and a second, rearward position, to the right in FIG. 5, wherein the teeth 246 of the dog clutch 240 engage the gear teeth 238 on the carrier 236 and provide a reduced speed drive between the input shaft 204 and the output shaft 212 in accordance with the gear ratio provided by the planetary gear assembly 202. Typically, such gear and speed reduction ratios are in the range of 2.5:1 to 4.0:1. The dog clutch 240 may also be moved to a third, neutral position mid-way between the forward, direct drive position and the rearward, reduced speed drive position. In this middle position, the input shaft 204 is disconnected from the output shaft 212 and no torque is transferred therebetween.

The position of the dog clutch 240 is commanded by an electric shift control motor 250. The electric shift control motor 250 bi-directionally rotates a drive shaft 252. The drive shaft 252 is suitably supported for rotation within the housing 50 of the transfer case assembly 200. The position of the drive shaft 252 may be monitored and read by an encoder assembly (not illustrated) which provides information about the current position of the drive shaft 252 and the dog clutch 240.

The drive shaft 252 is coupled to a radially extending arm 254. The arm 254 is connected to one end of a spiral spring assembly 256. The other end of the spring assembly 256 is connected to a cylindrical cam 258. The spring assembly 256 functions as a resilient, energy storing coupling between the drive shaft 252 and the cylindrical cam 258 to absorb differences between the movement commanded by the drive motor 250 and the driven components so that the shift motor 250 is allowed to reach its final requested position. The spring assembly 256 allows rapid and smooth response to a requested repositioning of the dog clutch 240 in situations where the gear teeth 246 of the dog clutch 240 do not instantaneously engage the internal teeth 224 of the input shaft 204 or the internal gear teeth 238 of the planetary gear carrier 236. When relative rotation of the dog clutch 240 allows engagement of the aforementioned clutch teeth, potential energy stored in the spring assembly 256 rotates the cylindrical cam 258 to its requested position, thus completing the shift.

The cylindrical cam 258 defines a helical track 262 which extends preferably about 270° around the cylindrical cam 258. The helical track 262 receives a pin or cam follower 264 which is coupled to and translates a fork assembly 266. The fork assembly 266 is supported for bi-directional translation upon a fixed shaft 268 and includes a channel 272 which engages the flange 248 of the dog clutch 240. Rotation of the shaft 252 axially repositions the cam follower 264 and axially repositions the dog clutch 240 from one to another of the three positions described above.

It should be appreciated that the planetary gear assembly 202 including the mechanism of the dog clutch 240 which provides dual range, i.e., high and low speed, capability to the first alternate embodiment transfer case assembly 200 is optional and that the vehicle drive system 10 and the transfer case assembly 16 are fully functional in accordance with the present invention as a single speed, direct drive unit. Thus, it may be utilized without this component and the dual speed range capability provided thereby. It should also be appreciated that the operation of the two-speed first alternate embodiment transfer 200 is, but for the ability to provide a reduced speed, increased torque drive range in addition to a normal drive range, the same in all operating and functional aspects as the preferred embodiment, single speed transfer case assembly 16. Reference to the above paragraphs relating to operation of the preferred embodiment transfer case assembly 16 is therefore encouraged.

The foregoing disclosure is the best mode devised by the inventor for practicing this invention. It is apparent, however, that apparatus incorporating modifications and variations will be obvious to one skilled in the art of motor vehicle driveline components. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A power distribution device for drivelines comprising, in combination,
a main drive member adapted to receive and deliver drive power,
a second drive member,
a one-way clutch operably disposed between said main drive member and said second drive member, and
a centrifugal clutch operably disposed between said main drive member and said second drive member, said one-way clutch and said centrifugal clutch disposed in mechanical parallel between said main drive member and said second drive member.

2. The power distribution device of claim 1 wherein said second drive member is a chain drive sprocket and further including an output shaft, a driven chain sprocket disposed on said output shaft and a chain engaging said chain sprockets.

3. The power distribution device of claim 1 further including an input shaft and a speed reduction assembly operably disposed between said input shaft and said main drive member.

4. The power distribution device of claim 4 further including an operator selectable speed range control.

5. The power distribution device of claim 1 wherein said centrifugal clutch includes a center drive member defining a pair of opposed recesses, a pair of clutch shoes disposed in said recesses and an annular member disposed about said clutch shoes and operably coupled to drive said secondary drive member.

6. The power distribution device of claim 1 wherein said one-way clutch includes a plurality of circumferentially spaced apart rollers and a circular member having a plurality of circumferentially spaced apart cam surfaces engageable by said rollers.

7. The power distribution device of claim 1 wherein said one-way clutch and said centrifugal clutch are each concentrically disposed upon said main drive member.

8. The power distribution device of claim 1 further including a chain drive sprocket rotatably disposed upon said main drive member and interposed said one-way clutch and said centrifugal clutch.

9. A torque distribution device for motor vehicles comprising, in combination,
a first drive member adapted to receive and provide torque to a first driveline,
a second drive member adapted to provide torque to a second driveline,
an overrunning clutch operably disposed between said first drive member and said second drive member, and
a centrifugal clutch operably disposed between said first drive member and said second drive member, said one-way clutch and said centrifugal clutch disposed in mechanical parallel between said main drive member and said second drive member.

10. The torque distribution device of claim 9 wherein said second drive member is a chain drive sprocket and further including an output shaft, a driven chain sprocket disposed on said output shaft and a chain engaging said chain sprockets.

11. The torque distribution device of claim 9 further including an input shaft and a speed reduction assembly operably disposed between said input shaft and said first drive member.

12. The torque distribution device of claim 9 wherein said centrifugal clutch includes a center drive member defining a pair of opposed recesses, a pair of clutch shoes disposed in said recesses and an annular member disposed about said clutch shoes and adapted to drive said second drive member.

13. The torque distribution device of claim 9 wherein said overrunning clutch includes a plurality of circumferentially spaced apart rollers and a circular member having a plurality of circumferentially spaced apart cam surfaces engageable by said rollers.

14. The torque distribution device of claim 9 wherein said overrunning clutch and said centrifugal clutch are each concentrically disposed upon said first drive member.

15. A motor vehicle transfer case comprising, in combination,
a housing,
a main drive shaft supported for rotation within said housing,
a secondary drive shaft supported for rotation within said housing,
a chain drive sprocket rotatably disposed upon said main drive shaft,
a one-way clutch operably disposed between said main drive shaft and said chain drive sprocket, a centrifugal clutch operably disposed between said main drive shaft and said chain drive sprocket, and
a drive chain coupling said chain drive sprocket.

16. The motor vehicle transfer case of claim 15 wherein said one-way clutch is configured to rotate said secondary drive shaft at least as fast as said main drive shaft and allow overrunning of said secondary drive shaft relative to said main drive shaft, both when said main drive shaft is rotating in a direction corresponding to forward vehicle motion.

17. The motor vehicle transfer case of claim 16 where said direction of rotation of said main drive shaft corresponding to forward vehicle motion is counter-clockwise when viewed from a rear portion of such vehicle.

18. The motor vehicle transfer case of claim 15 further including an input shaft and a speed reduction assembly operably disposed between said input shaft and said main drive shaft.

19. The motor vehicle transfer case of claim 18 further including an operator selectable speed range control.

20. The motor vehicle transfer case of claim 15 wherein said centrifugal clutch includes a center drive member defining a pair of opposed recesses, a pair of clutch shoes disposed in said recesses and an annular member disposed about said clutch shoes and operably coupled to said secondary drive shaft.

* * * * *